(12) United States Patent
McKeown et al.

(10) Patent No.: US 9,127,858 B2
(45) Date of Patent: Sep. 8, 2015

(54) MULTI-CIRCUIT MANIFOLD AND METHOD FOR A GEOTHERMAL ENERGY SYSTEM

(76) Inventors: David Wayne McKeown, Fergus (CA); Daniel Brent McKeown, Fergus (CA)

(*) Notice: Subject to any disclaimer, the term of this patent is extended or adjusted under 35 U.S.C. 154(b) by 1059 days.

(21) Appl. No.: 12/953,631

(22) Filed: Nov. 24, 2010

(65) Prior Publication Data

US 2012/0125560 A1 May 24, 2012

(51) Int. Cl.
  *F24J 3/08* (2006.01)
  *F16L 47/32* (2006.01)
  *F28F 9/02* (2006.01)

(52) U.S. Cl.
  CPC .......... *F24J 3/081* (2013.01); *F16L 47/32* (2013.01); *F28F 9/02* (2013.01); *F24J 2003/087* (2013.01); *F28F 2255/143* (2013.01); *Y02E 10/12* (2013.01); *Y10T 29/53* (2015.01)

(58) Field of Classification Search
  CPC ....... F24J 3/083; F24J 3/081; F24J 2003/087; Y02E 10/125; Y02E 10/12; F28F 9/0246; F28F 9/0256; F28F 9/0275; F16L 41/03; F16L 41/023; F16L 47/32; Y10T 29/53
  USPC ............... 165/45, 139, 178; 285/122.1, 124, 285/130.1; 60/641.2; 62/260; 138/44
  See application file for complete search history.

(56) References Cited

U.S. PATENT DOCUMENTS

| | | | |
|---|---|---|---|
| 2,787,138 A * | 4/1957 | Boyle | 62/525 |
| 3,567,259 A * | 3/1971 | Benson et al. | 285/381.4 |
| 3,745,787 A * | 7/1973 | Ponziani | 62/504 |
| 3,952,642 A | 4/1976 | Vitous | |
| 4,054,176 A | 10/1977 | Van Huisen | |
| 4,521,677 A | 6/1985 | Sarwin | |
| 4,549,567 A | 10/1985 | Horton | |
| 4,832,119 A | 5/1989 | Bloor et al. | |
| 4,871,017 A | 10/1989 | Cesaroni | |
| 5,224,357 A * | 7/1993 | Galiyano et al. | 62/260 |
| 5,277,224 A | 1/1994 | Hutton et al. | |
| 5,467,474 A | 11/1995 | Ackerman et al. | |
| 5,533,355 A * | 7/1996 | Rawlings | 62/260 |
| 5,537,312 A | 7/1996 | Sekiguchi et al. | |
| 5,632,010 A | 5/1997 | Briechle et al. | |
| 5,736,967 A | 4/1998 | Kayser et al. | |

(Continued)

FOREIGN PATENT DOCUMENTS

| | | |
|---|---|---|
| GB | 2347296 A | 8/2000 |
| GB | 2430535 A | 3/2007 |

(Continued)

*Primary Examiner* — Tho V Duong
(74) *Attorney, Agent, or Firm* — Reinhart Boerner Van Deuren s.c.

(57) ABSTRACT

A geothermal energy system including a heat pump. The system includes a first manifold and a second manifold and a plurality of pipes. Each manifold includes a housing having a first end and a second end. A single orifice is defined in the first end and a plurality of orifices are defined in the second end. Each of the orifices in the second end define a terminus of a tube extension. Each tube extension is configured an angular distance from an adjacent tube extension. Each tube extension is orientated such that the longitudinal center line of each tube extension intersects at a point on the longitudinal center line of the single orifice defined in the first end of the housing. The first and second manifolds and the plurality of pipes are in fluid communication with the heat pump and configured to transfer thermal energy with a geothermal energy source.

7 Claims, 8 Drawing Sheets

(56) References Cited

U.S. PATENT DOCUMENTS

| | | | |
|---|---|---|---|
| D398,375 S | 9/1998 | Lynch et al. | |
| 6,243,690 B1 | 6/2001 | Adamec et al. | |
| 6,550,673 B2 | 4/2003 | Massaro | |
| 6,557,628 B2 * | 5/2003 | Ohmer | 166/50 |
| 6,624,757 B1 | 9/2003 | Johnson | |
| 6,749,116 B2 | 6/2004 | Massaro | |
| 6,844,821 B2 | 1/2005 | Swartzel et al. | |
| 7,048,037 B2 | 5/2006 | McNair | |
| 7,146,823 B1 * | 12/2006 | Wiggs | 62/260 |
| 7,152,040 B1 | 12/2006 | Hawthorne et al. | |
| D553,156 S | 10/2007 | Nimberger | |
| 7,392,948 B2 | 7/2008 | Smith et al. | |
| D578,549 S | 10/2008 | Nimberger | |
| 7,503,382 B2 | 3/2009 | Maezawa et al. | |
| 7,520,429 B2 | 4/2009 | Koster | |
| 7,886,558 B2 * | 2/2011 | Wiggs | 62/282 |
| 7,938,904 B1 * | 5/2011 | Wiggs | 106/713 |
| 8,151,885 B2 * | 4/2012 | Bull et al. | 166/305.1 |
| 2006/0048928 A1 * | 3/2006 | Maezawa et al. | 165/173 |
| 2007/0131405 A1 * | 6/2007 | Harada et al. | 165/178 |
| 2008/0016894 A1 * | 1/2008 | Wiggs | 62/260 |
| 2010/0326648 A1 * | 12/2010 | McGuire | 166/90.1 |

FOREIGN PATENT DOCUMENTS

| | | |
|---|---|---|
| GB | 2450754 A | 1/2009 |
| GB | 2450755 A | 1/2009 |
| JP | 2612227 b2 * | 5/1997 |
| JP | 11242452 | 2/1998 |
| WO | WO 9946544 A1 * | 9/1999 |

* cited by examiner

Prior Art

MULTI-CIRCUIT MANIFOLD AND METHOD FOR A GEOTHERMAL ENERGY SYSTEM

BACKGROUND OF THE INVENTION

Field of the Invention

The present disclosure relates to geothermal energy systems, and more particularly, to a geothermal energy system for a building, including a manifold configured to couple a network of pipe to a heat pump without a reverse return piping configuration.

Geothermal energy systems typically include a heat pump which converts the thermal energy obtained from the geothermal energy source to heat or cooling of a building in which the heat pump is located. In a conventional geothermal heat pump system, the earth's ability to absorb and store energy is utilized to convert that energy into a heating or cooling process. The earth's temperature, stays fairly constant (at about 10 degrees Celsius or 50 degrees Fahrenheit), regardless of climate or season, making earth a virtual unlimited energy source. A geothermal heat pump uses the available heat in the winter and puts heat back into the ground in summer.

During the heating cycle, a fluid, typically water, is circulated through an underground network of piping and absorbs heat from the soil. In a typical installation, the network of pipes is usually buried 4-6 feet under ground in a horizontal ground loop. The heated water is pumped back to the heat pump unit inside the building. In the heat pump, the heat from the water is transferred to a refrigerant which boils at a low-temperature and becomes a vapor. A reversing valve directs the refrigerant vapor to a compressor. The vapor is then compressed, which reduces its volume and causes it to heat up. Finally the reversing valve directs the hot gas to the condenser coil, where it gives out its heat to the air that is blowing across the coil and through the duct system to heat the building. After giving up its heat, the refrigerant passes through an expansion device, where its temperature and pressure are dropped further before it returns to the first heat exchanger to begin the cycle again. The now cooled water is pumped back into the pipe network underground to again be heated.

In the cooling cycle, the process is the reverse of the heating cycle. The direction of the refrigerant flow is changed by the reversing valve. The refrigerant accepts heat from the house air and transfers it to the fluid, again typically water, being pumped through the underground piping network. The heat is then pumped outside into the underground piping.

As mentioned above, the underground piping network can be in a horizontal ground loop positioned about the 6 feet underground. However, it is also known that the piping network can be in a directional ground loop wherein each individual loop is positioned diagonal into the ground beginning at about 4-6 feet below the surface. A third piping network can be a vertical group loop where bores are drilled straight down typically 180 feet of a loop per ton of heating requirement.

Regardless of the piping network, the use of high density polyethylene (HDPE) pipe is used to circulate the fluid through the ground to capture the earth's energy. In some cases, specific guidelines are set up, for example by the Canadian Standards Association (CSA) when it comes to all components of the heat pump installation. In a typical piping network, two manifolds, also referred to as headers, are required to complete the ground loop circuits. One end of each of the manifolds is coupled to the heat pump system to complete the geothermal energy system.

Two manifolds typically are required in order to complete the circuit. Unless arranged in a specific order each circuit has a different volume of flow, causing preferential flow. Some jurisdictions, like the Canadian Geo-Exchange and CSA regulations require the two headers must be fused together in a reverse return fashion. (See current CSA 448, Section 10-2 (b) reverse return piping shall be used to minimize the need for balancing flow.

It is known in the art of geothermal energy systems that assembly of the manifolds in the field can result in mistakes in assembling of the manifolds which typically result in leaks and loss of pressure and fluid. It is known in the art that in order to comply with the reverse return piping arrangement, that errors may occur in connecting the two manifolds of the piping network resulting in uneven or unbalanced flow of fluid through the piping network.

The apparatus and system of the present disclosure must be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

A manifold in a geothermal system, including a housing having a first end and a second end. A single orifice is defined in the first end and a plurality of orifices are defined in the second end. Each of the orifices in the second end define a terminus of a tube extension defined by the housing. Each tube extension is configured an angular distance from an adjacent tube extension. Each tube extension is orientated such that the longitudinal center line of each tube extension intersects at a point on the longitudinal center line of the single orifice defined in the first end of the housing.

There is further provided a geothermal energy system including a heat pump to heat and cool a building. The system includes a first manifold and a second manifold and a plurality of pipes. Each manifold includes a housing having a first end and a second end. A single orifice is defined in the first end and a plurality of orifices are defined in the second end. Each of the orifices in the second end define a terminus of a tube extension defined by the housing. Each tube extension is configured an angular distance from an adjacent tube extension. Each tube extension is orientated such that the longitudinal center line of each tube extension intersects at a point on the longitudinal center line of the single orifice defined in the first end of the housing. Each pipe of the plurality of pipes is coupled to the first and second manifold, wherein the first and second manifolds and the plurality of pipes are in fluid communication with the heat pump and configured to transfer thermal energy with a geothermal energy source.

There is also provided a method for installing a network of pipes in a geothermal energy system for heating and cooling a building. The geothermal system including a heat pump coupled to a first manifold and a second manifold, with each manifold having a first end and a second end and coupled to a plurality of pipes, with each pipe having a first end and a second end.

The method includes the steps of inserting the first end of a first pipe into any orifice defined in the second end of the first manifold; inserting the second end of the first pipe into any orifice defined in the second end of the second manifold; inserting the first end of a second pipe into any orifice defined in the second end of the first manifold; inserting the second end of the second pipe into any orifice defined in the second end of the second manifold; inserting the first end of at least one additional pipe into any orifice defined in the second end of the first manifold; inserting the second end of the at least one additional pipe into any orifice defined in the second end of the second manifold.

The method further includes inserting the first end of a first main pipe into an orifice defined in the first end of the first manifold; coupling the second end of the first main pipe to the heat pump; inserting the first end of a second main pipe into an orifice defined in the first end of the second manifold; coupling the second end of the second main pipe to the heat pump. Each end of the first, second, and at least one additional pipe is bonded to the first and second manifolds. The first end of the first and second main pipe are bonded to the first and second manifolds, wherein each of the manifolds and pipes are in fluid communication with the heat pump and configured to transfer thermal energy with a geothermal energy source.

The apparatus of the present invention is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

Figure 1:
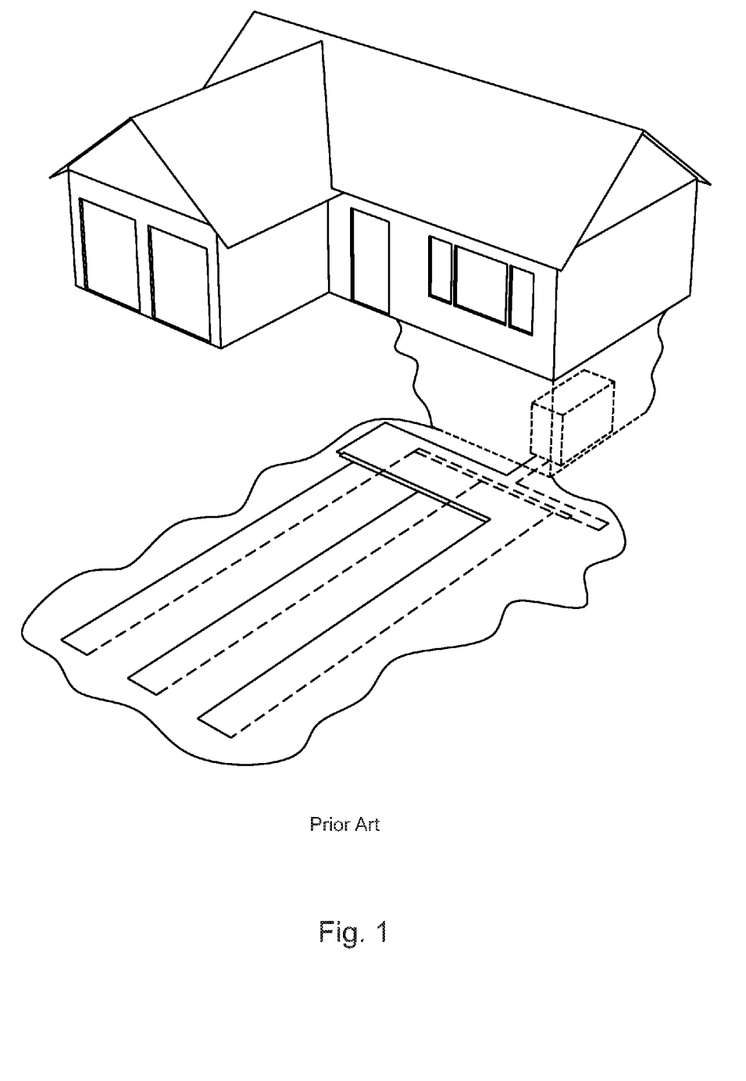
FIG. 1 is an illustration of a prior art geothermal system for a building including a pair of prior art manifolds coupled to a plurality of pipes disposed horizontally in the ground.

FIGS. 1-6 illustrate a conventional geothermal energy system used for heating and cooling of a building. FIG. 1 illustrates a network of pipes disposed in the ground with two conventional headers connecting the piping network to a heat pump (not shown).

Figure 4:
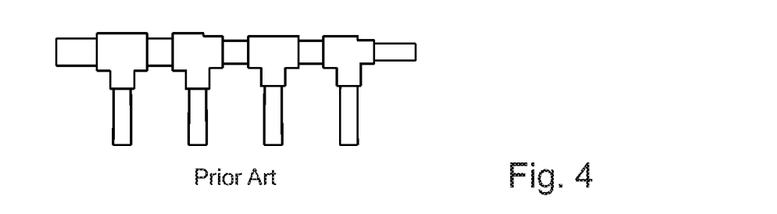
FIG. 4 is an illustration of a prior art 5-circuit manifold.

FIG. 4 shows a typical, conventional, prior art manifold also referred to as a header. The particular example is a 5-circuit system configured to provide 5-gallon per minute flow of fluid through the piping network. It should be noted that the stated flow will only be correct if a second header, similarly configured, is coupled to the illustrated header in the reverse return series to balance the flow through the system. The horizontal pipe of the header, from left to right, has a decreasing inside diameter in order to maintain the constant gallon per minute flow of the fluid passing through the piping network. In a typical configuration, the pipes are attached to a T-junction which forms the horizontal reducing diameter header as illustrated in FIG. 4. Each of the T-joints, and piping segments are composed of HDPE pipe and requires as many as 15 fusion joints along the length of this header.

Figure 2:
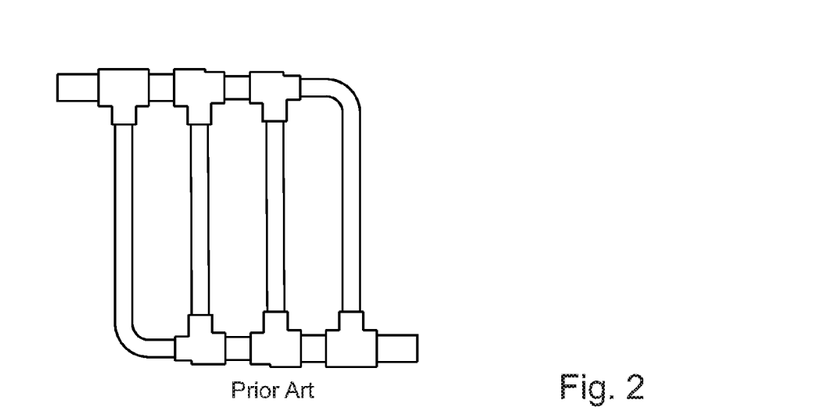
FIG. 2 is an illustration of a prior art 4-circuit manifold and associated pipes for a geothermal system.
Figure 3:
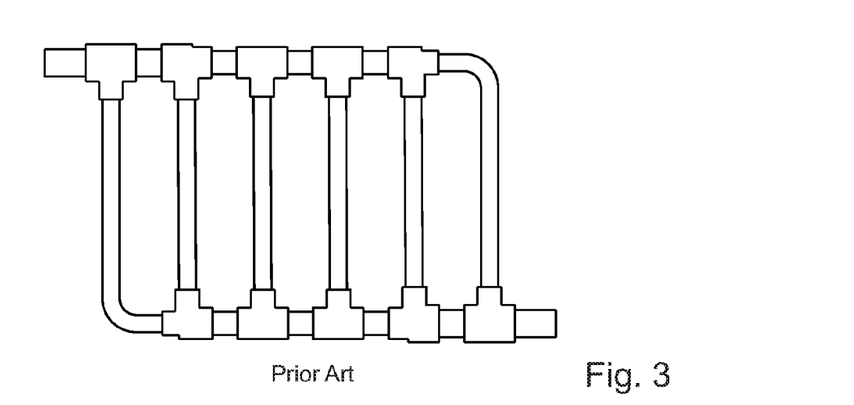
FIG. 3 is an illustration of a prior art 6-circuit manifold and associated pipes for a geothermal system.

FIGS. 2 and 3 illustrate conventional, prior art manifolds coupled to a piping network in a reverse return arrangement. FIG. 2 illustrates a 4-circuit manifold and piping network and FIG. 3 illustrates a 6-circuit manifold and piping network. The piping networks in FIGS. 2 and 3 will be installed underground as the 3-circuit manifold and piping system is illustrated in FIG. 1.

Figure 5:
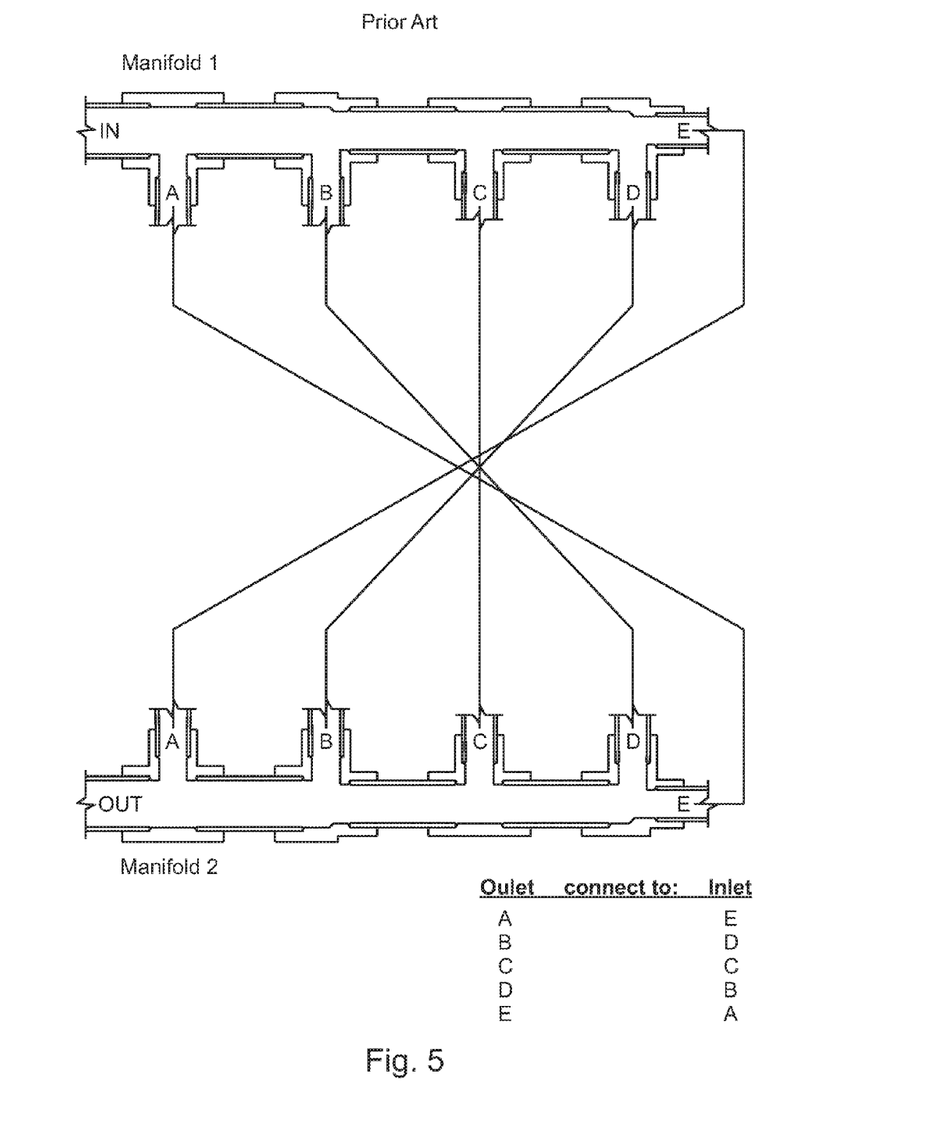
FIG. 5 is an illustration of a prior art geothermal system including two manifolds and illustrating a typical reverse return connection pattern for the plurality of pipes between the two manifolds.

As mentioned above, in order to maintain the balanced flow through each of the pipes through the manifold, a reverse return configuration must be established for the piping network and the two manifolds that make up the in-ground portion of the conventional geothermal energy system. FIG. 5 illustrates an example of a conventional (prior art) reverse return connection scheme. Output A in manifold 1 must be connected to inlet E of manifold 2; outlet B of manifold 1 must be connected to inlet D of manifold 2; outlet C of manifold 1 must be connected to inlet C of manifold 2; outlet D of manifold 1 must be connected to inlet B of manifold 2; and outlet E of manifold 1 must be coupled to inlet A of manifold 2. If any of such connections for a conventional reverse return scheme is improperly established, a balanced flow within the piping network will not be achieved and the efficiency of the geothermal energy system will be compromised. Further, since manifold 1 and manifold 2 of the conventional type are composed of a plurality of pipes and T-junctions, each requiring multiple fusion joints, the possibility of leaks occurring because of improper jointing or misalignments will also compromise the integrity and efficiency of the piping network of the conventional geothermal energy system.

The present disclosure provides a manifold 30,31, a geothermal energy system 20, and a method of installing a network of pipes 28 in a geothermal energy system 20 for heating and cooling of buildings 26 that avoids the problems identified above. Specifically, the manifold (See FIG. 10) is configured without T-joints. There are fewer fusion joints required to couple a piping network to the two required manifolds 30,31. The flow of fluid through each of the manifolds 30,31 and therefore through each of the plurality of pipes 60 of the piping network 28 are equal. There is no need for a reverse return scheme for coupling the piping network to the two manifolds 30,31. A balanced flow of fluid through each of the manifolds and the piping network 28 to and from the heat pump 22 is achieved regardless of the orientation of the piping network 28 in the ground.

To achieve the above advantages, reference should be made to FIGS. 9-12 of the present disclosure.

Figure 6:
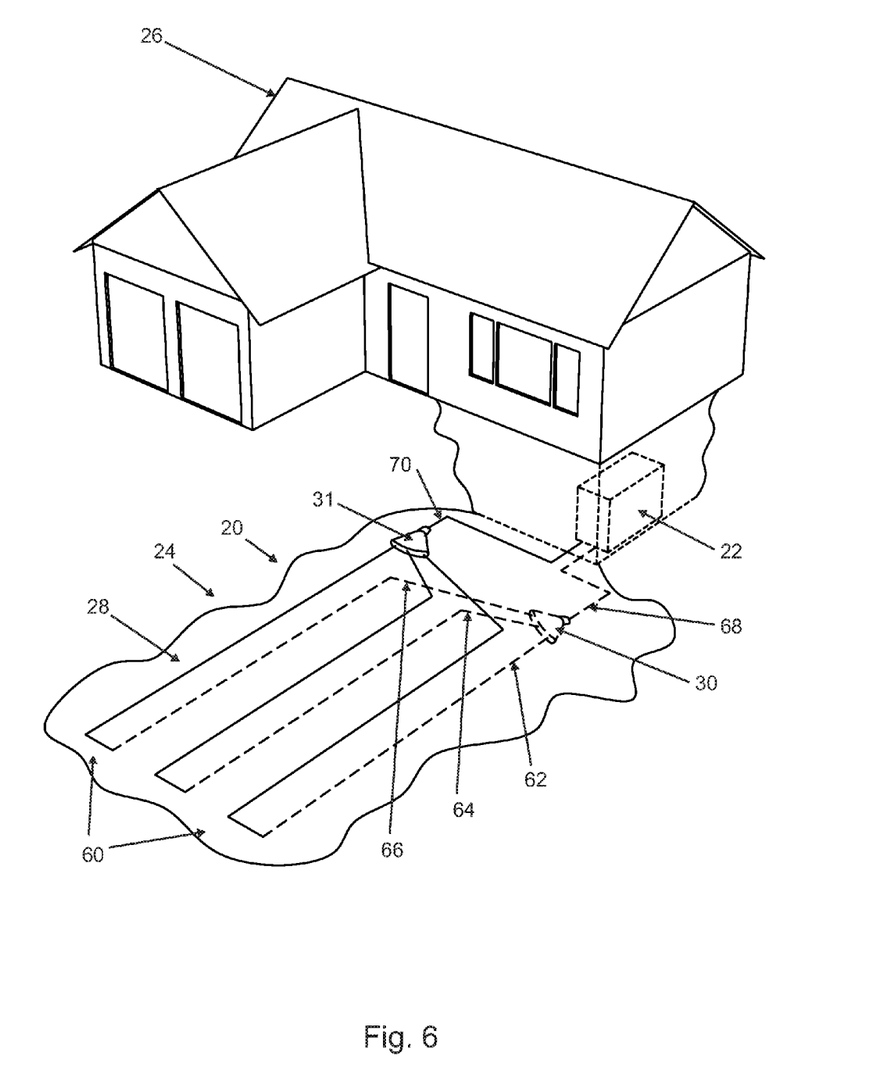
FIG. 6 is an illustration of an exemplary embodiment of a geothermal energy system including a heat pump and network of pipes coupled to the heat pump and network of pipes couples to the heat pump with two exemplary embodiments of a 3-circuit manifold of the present invention disposed horizontally in the ground.

FIG. 6 is an illustration of a geothermal energy system 20 including a heat pump 22 sited in a building 26 and coupled to a heat exchange field 24. The specific illustration is of a pair of 3-circuit manifolds coupled to a network of pipes 28. FIG. 6 illustrates the horizontal ground loop type of orientation of the plurality of pipe 60. However, as discussed above, the plurality of pipes 60 of the heat exchange field 24 can be orientated in a directional ground loop or in a vertical ground loop.

Figure 7:
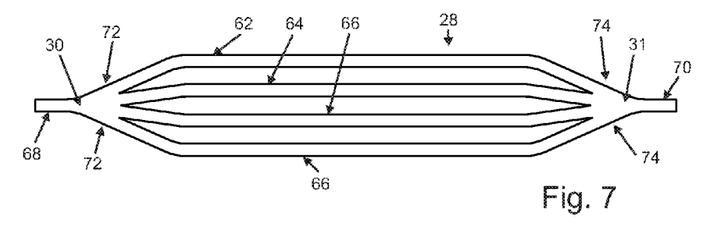
FIG. 7 is an illustration of an exemplary embodiment of a geothermal energy system network of pipes coupled to two exemplary embodiments of a 4-circuit manifold of the present invention.
Figure 8:
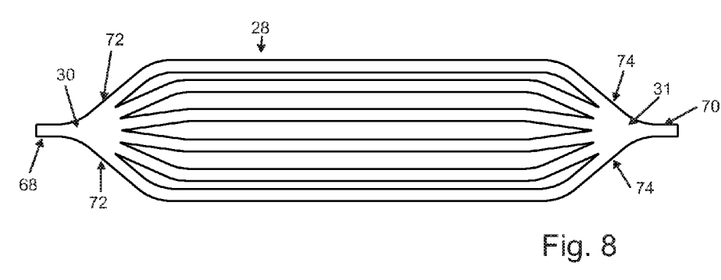
FIG. 8 is an illustration of an exemplary embodiment of a geothermal energy system network of pipes coupled to two exemplary embodiments of a 6-circuit manifold of the present invention.

FIGS. 7 and 8 illustrate exemplary embodiments of a 4-circuit manifold and 6-circuit manifold systems respectively. Each of these embodiments utilize a first manifold 30 and a second manifold 31 that differ only in the number of tube extensions 44 defined in the manifolds. It should be noted that any number of tube extensions 44 can be defined in the manifolds but the typical number is one of three, four, five, and six tube extensions 44. As will be discussed below, each of the tube extensions is coupled to a pipe of the network of pipes 28 which is part of the geothermal energy system 20.

FIGS. 9, 10, 11, and 11A illustrate a manifold 30 having five tube extensions 44. The following will be a discussion of the manifold illustrated in those figures with the understanding that at least two manifolds of similar construction are needed in a geothermal energy system 20. Although the five tube extension configuration will be described, the manifold configuration with any number of tube extensions would be the same.

In the geothermal energy system 20 two manifolds 30,31 are used. The following will be a discussion about one such manifold, however it should be understood that the general features described below are applicable to any type of manifold set forth in the appended claims.

Figure 9:
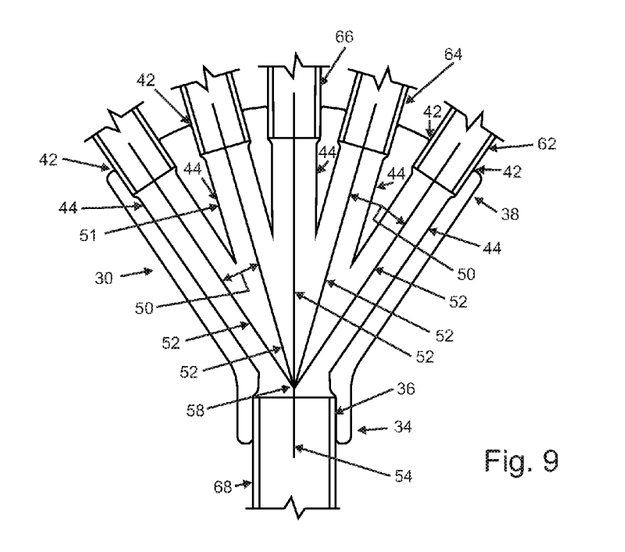
FIG. 9 is a schematic diagram of an exemplary embodiment of a 5-circuit manifold illustrating the alignment of the longitudinal center line of each tube extension defined in the manifold at a point on the longitudinal center line of the single orifice defined in the manifold.
Figure 10:
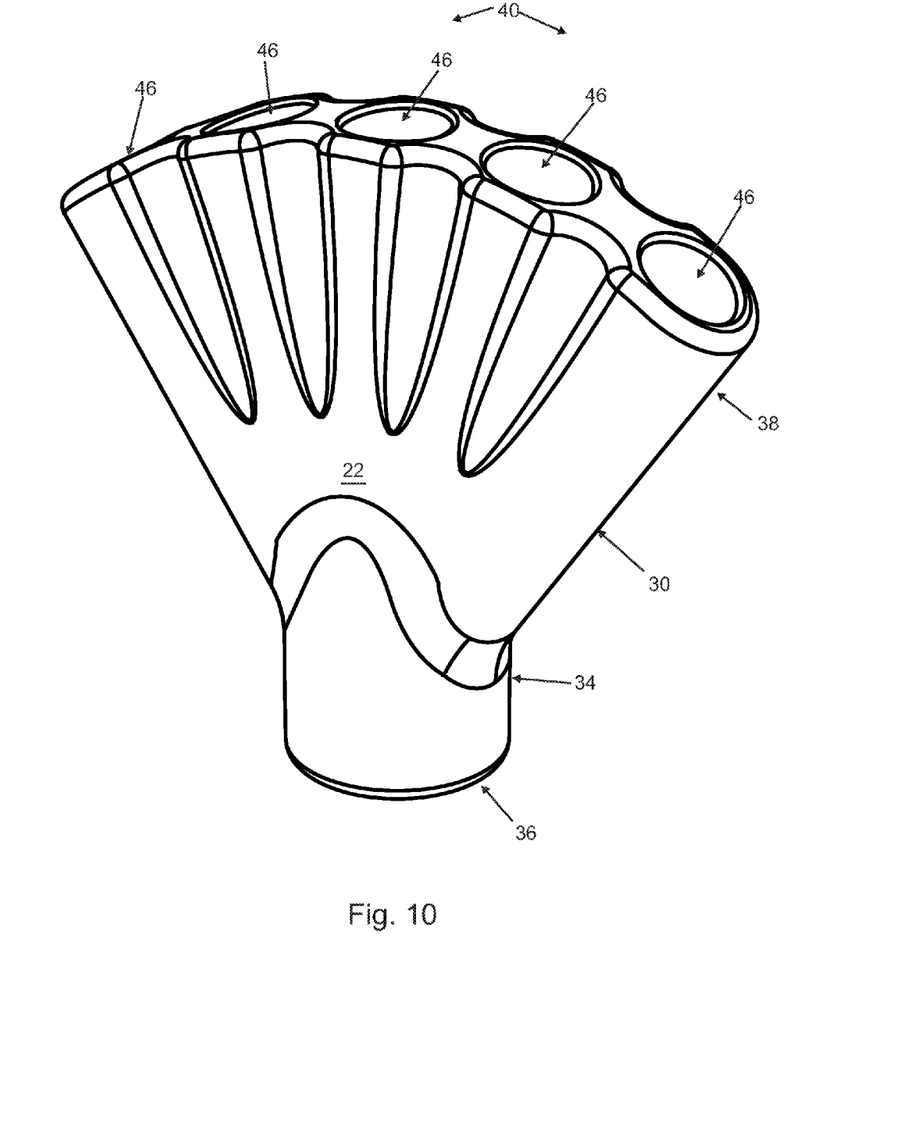
FIG. 10 is a perspective view illustration of the 5-circuit manifold of FIG. 9.
Figure 11:
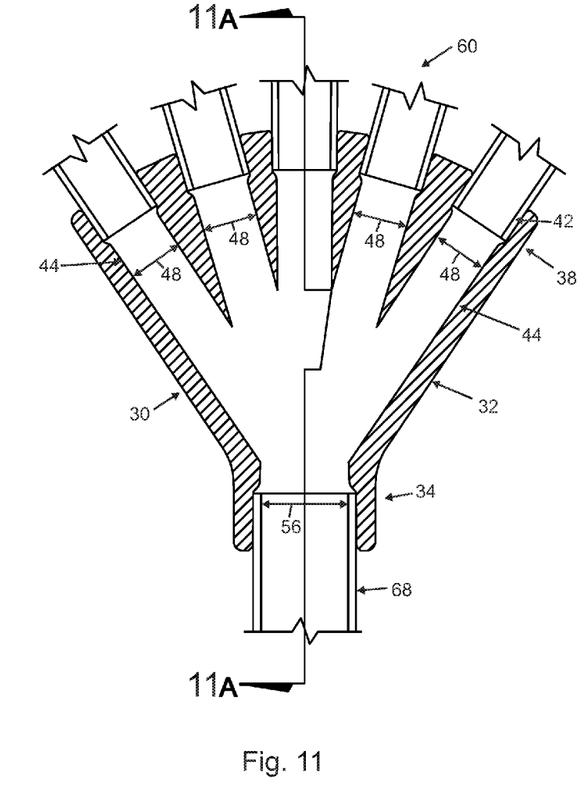
FIG. 11 is a cross-section of the 5-circuit manifold illustrated in FIG. 10 in the same plane as the tube extensions of the manifold.
Figure 11A:
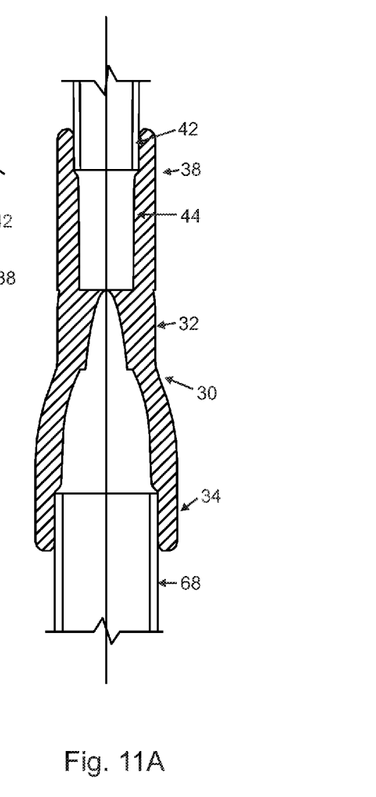
FIG. 11A is a cross-section along the line 11A-11A of the manifold in FIG. 11.
Figure 12:
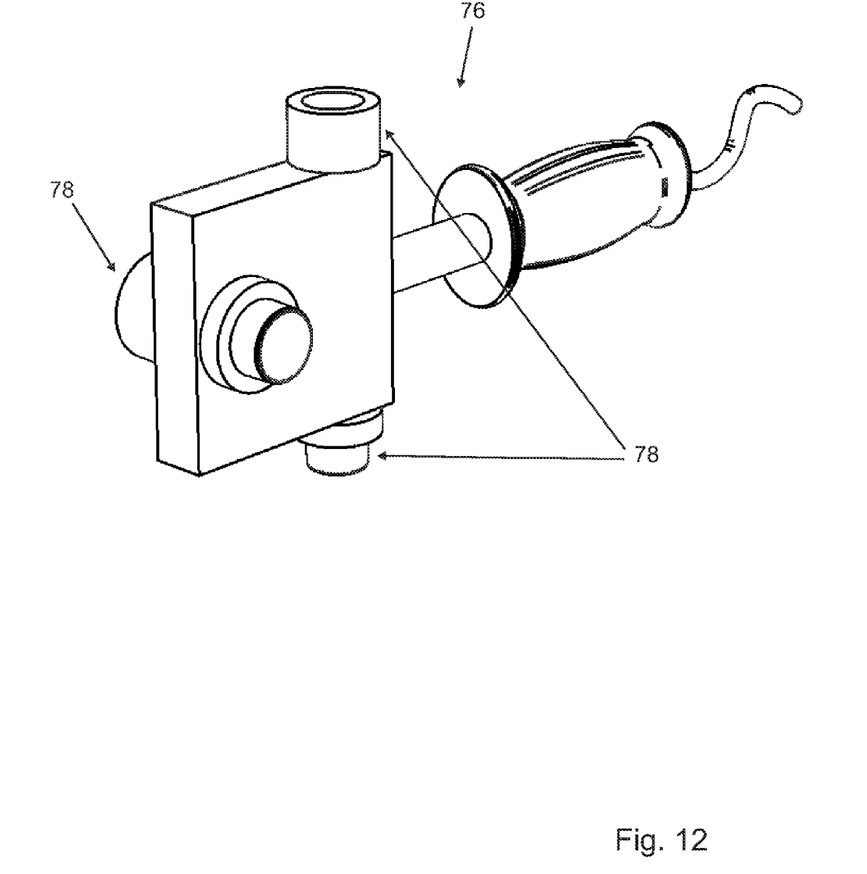
FIG. 12 is an illustration of an exemplary embodiment of a fusion tool assembly for molecular bonding of pipes to a manifold of the present invention.

A manifold 30 in a geothermal energy system 20 includes a housing 32. The housing has a first end 34 and a second end 38 and has a substantially fan-shaped appearance as illustrated in FIGS. 9, 10, and 11. The housing can be manufacturing in any convenient and conventional manner, however the preferred embodiment is to mold the manifold 30 as a single integral piece such as by, for example injection molding, lost wax or similar molding processes. The first end 34 of the housing 32 defines a single orifice 36. The second end 38 of the housing 32 defines a plurality of orifices 40. Each of the orifices 46 in the second end 38 define a terminus 42 of a tube extension 44 defined in the housing 32.

The housing 32 of a manifold 30 can have any number of tube extension 44. The number of tube extensions 44 is determined by the number of geothermal pipe circuits used in the network of pipes of the heat exchange field 24 of the geothermal energy system 20. Each tube extension 44 is an angular distance 50 from an adjacent 51 tube extension defined in the housing 32 of the manifold 30. Each tube extension 44 is orientated such that the longitudinal center line 52 of each tube extension 44 intersects at a point 58 on the longitudinal center line 54 of the single orifice 36 defined in the first end 34 of the housing 32. (See FIG. 9.)

The fan-shaped housing 32 with the tube extensions 44 orientated as described above, eliminates preferential flow to any circuit in the geothermal energy system 20. The flow is balanced and the configuration eliminates the need for the reverse return method described above required for a conventional manifold in a conventional prior art geothermal system.

Each tube extension 44 meeting the other, adjacent, tube extensions in the interior of the housing 32 to form a parabolic shape facilitates the balancing of flow through the manifold 30. (See FIG. 11A.) The interior diameter 48 of each tube extension 44 is the same with the balance of flow control assisted by the angular distance 50 between the tube extensions 44 in the fan-shaped housing 32. (See FIGS. 9 and 11.) For example, in FIG. 11, the two outermost tube extensions 44 are further angularly apart from their immediate adjacent tube extension wherein the two tube extensions immediately adjacent to the centermost tube extension have a smaller angular distance to the center tube extension than from the two outermost tube extensions. The wedges formed between the tube extensions as illustrated in FIGS. 9 and 11 are part of the housing 32 and are created during the molding process of the housing 32. The angular distance 50 between adjacent tube extensions 44 will vary depending on the number of tube extensions in a given manifold. As mentioned above, the concept of balance flow without the requirement of a reverse return scheme is applicable to manifolds of a 3, 4, 5, 6, manifolds which are the typical manifold circuit configurations for the geothermal energy system 20.

The single orifice 54 defined in the first end 34 of the manifold defines an inner diameter 56 which is larger than the inner diameter 48 defined in any of the orifices in the second end 38 of the housing 32 of the manifold 30. In each manifold, the tube extensions align axisymmetric in the same plane about the longitudinal center line 54 of the single orifice 36 defined in the first end 34 of the housing 32.

In the geothermal energy system 20, as illustrated in FIG. 6, utilizing the manifolds described above, a heat pump 22 is installed in the building 26 for purposes of heating and cooling the building 26. In such a system, there is a first manifold 30 and a second manifold 31. Each of the manifolds are configured as described above.

In the illustration of FIG. 6, the manifolds 30,31 have three tube extensions 44 connected to a network of pipes 28 in the heat exchange field 24. The plurality of pipes 60 in the network of pipes 28 are configured so that each pipe is coupled to the first and second manifold, 30, 31, wherein the first and second manifolds and the plurality of pipes are in fluid communication with the heat pump 22 and configured to transfer thermal energy with a geothermal heat source such as the earth. It should be understood that the geothermal heat source can also be a pond or a lake and then the network of pipes 28 would be submerged at an appropriate depth in such pond or lake.

A plurality of pipes 60 and the manifolds 30,31 of the geothermal energy system 20 are composed of high density polyethylene. Such material is typically mandated by applicable governmental rules and regulations. The coupling of the various plurality of pipes 60 with the manifolds 30,31 as well as with the heat pump 22 required molecular fusion joints which are formed with the use of a fusion tool assembly 76. (See FIG. 12.) The fusion tool assembly 76 typically includes a plurality of fusion plugs 78 which are configured to fit in the inside diameter of the pipes or orifices of the manifold or on the outside diameter of the pipes. The HDPE is typically heated and fused at temperatures ranging from 500 to 520 degrees Fahrenheit (260-270 Centigrade) and the heating time varies between 6 to 8 seconds coupling the pieces together, holding them for approximately 60 seconds, and allowing the junctions to cure for at least 10 minutes. If there are bigger pipes with thicker wall diameters, it may require additional heating time of between 16 to 18 seconds per unit. It is contemplated that additional methods of bonding the various piping to the manifolds, to each other, and to the heat pump can be accomplished with other processes such as adhesives or other approved bonding devices, without compromising the efficiency or integrity of the geothermal energy system.

In making the connections of the plurality of pipes 62 the two manifolds 30,31, it should be understood that the pipes can be coupled to any of the orifices 46 of the tube extensions 44 of a given manifold. Since the flow is balanced through each of the manifolds, it is not necessary to establish a reverse return scheme for the plurality of pipes 60 as is required in prior art conventional headers, as illustrated in FIGS. 1-5. In installing a network of pipes 28 in the geothermal energy system 20 for heating and cooling a building 26, the geothermal energy system 20 includes a heat pump 22 which is coupled to a first manifold 30 and a second manifold 31. Each manifold 30,31 has a first end and a second end and each is coupled to a plurality of pipes 60. Each pipe of the plurality of pipes 62 has a first end 72 and a second end 74. The method includes inserting the first end 72 of the first pipe 62 into any orifice 46 defined in the second end 38 of the first manifold 30; and inserting the second end 74 of the first pipe 62 into any orifice 46 defined in the second end 38 of the second manifold 31. The same procedure would follow for the second pipe 64 and any additional pipes 66 since the first manifold 30 and the second manifold 31 are identical. In other words, the first end 72 of each of the second 64 and additional 66 pipes are inserted into the second ends 38 of the first manifold 30. The second end 74 of each of the pipes are inserted into the second end of the second manifold 31.

To complete the circuit, the first end 72 of a first main pipe 68 is inserted into the orifice 36 defined in the first end 34 of the first manifold 30. The second end 74 of the first main pipe 68 is coupled to the heat pump 22. The first end 72 of a second main pipe 70 is inserted into the orifice 36 defined in the first end 34 of the second manifold 31. The second end 74 of the second main pipe 70 is coupled to the heat pump 22. Each of the first, second, and at least one additional pipe is bonded to the first and second manifolds 30,31 and bonding the first end of the first and second main pipe 68,70 to the first and second manifolds 30,31 and bonding the second end 74 of each of the first main pipe 68 and second main pipe 70 to the heat pump. The bonding, as described above is accomplished by the use of the fusion assembly tool 76. In this method, each of the manifolds 30,31 and the plurality of pipes 60 and the first and second main pipes 68,70 are in fluid communication with the heat pump 22 and configured to transfer thermal energy with a geothermal heat source, for example the earth.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present manifold and geothermal energy system has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the invention as described herein may be made, none of which depart from the spirit or scope of the present disclosure.

The particular embodiments and applications were chosen and described to provide the best illustration of the principles of the manifold and geothermal energy system and the practical application to thereby enable one of ordinary skill in the art to utilize the manifold and geothermal energy system various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A manifold configured to be used in a geothermal system, comprising:
   a housing having a first end and a second end;
   a single orifice defined in the first end;
   a first passage surrounding and extending along a first central axis from the single orifice toward the second end;
   a second orifice defined in the second end;
   a third orifice defined in the second end;
   a second passage surrounding and extending along a second central axis from the second orifice toward the first end, the second passage in communication with the first passage; and
   a third passage surrounding and extending along a third central axis from the third orifice toward the first end, the third passage in communication with the first passage
   wherein the first central axis, the second central axis, and the third central axis are coplanar;
   wherein the first central axis and the second central axis are coaxial; and
   wherein the second passage and the third passage meet each other to form a parabolic shape;
   a fourth orifice defined in the second end, a fourth passage surrounding and extending along a fourth central axis from the fourth orifice toward the first end, the fourth passage in communication with the first passage;
   wherein the third passage is located between the second passage and the fourth passage;
   wherein a first angle is defined between the second passage and the third passage;
   wherein a second angle is defined between the third central axis passage and the central axis passage; and
   wherein the second angle is greater than the first angle.

2. The manifold in a geothermal system of claim 1, wherein the single orifice of the first end of the housing defines an inner diameter that is larger than the inner diameter defined by any of the orifices in the second end of the housing; and
   wherein the shape of the second and third passages is configured to facilitate balancing of flow through the manifold.

3. The manifold in a geothermal system of claim 1, wherein the housing is configured in a single, integral piece.

4. The manifold in a geothermal system of claim 1, comprising a fifth orifice defined in the second end, a fifth passage surrounding and extending along a fifth central axis from the fifth orifice toward the first end, the fifth passage in communication with the first passage, a sixth orifice defined in the second end, a sixth passage surrounding and extending along a sixth central axis from the sixth orifice toward the first end, the sixth passage in communication with first passage;
- wherein the fifth passage is located between the second passage and the sixth passage;
- wherein a third angle is defined between the second passage and the fifth passage;
- wherein a fourth angle is defined between the fifth central axis passage and the sixth central axis passage;
- wherein the fourth angle is greater than the third angle; and
- wherein the first, second, third, fourth, fifth, and sixth central axes are coplanar.

5. The manifold in a geothermal system of claim 1, wherein the manifold is composed of high density polyethylene.

6. A geothermal energy system comprising:
- substantially identical first and second manifolds, the manifolds each including:
- a housing having a first end and a second end;
- a single orifice defined in the first end;
- a first passage surrounding and extending along a first central axis from the single orifice toward the second end;
- a second orifice defined in the second end;
- a third orifice defined in the second end;
- a second passage surrounding and extending along a second central axis from the second orifice toward the first end, the second passage in communication with the first passage;
- a third passage surrounding and extending along a third central axis from the third orifice toward the first end, the third passage in communication with the first passage;
- wherein the first, second, and third central axes are coplanar;
- comprising a fourth orifice defined in the second end, a fourth passage surrounding and extending along a fourth central axis from the fourth orifice toward the first end, the fourth passage in communication with the first passage;
- wherein the third passage is located between the second passage and the fourth passage;
- wherein a first angle is defined between the second passage and the third passage;
- wherein a second angle is defined between the third passage and the fourth passage; and
- wherein the second angle is the first angle.

7. The geothermal energy system of claim 6, comprising piping extending between the first manifold and the second manifold, the first manifold being configured to distribute fluid to the piping, the second manifold being configured to receive fluid from the piping;
- wherein the second passage and the third passage of each of the manifolds have a parabolic shape meeting each other.

* * * * *

UNITED STATES PATENT AND TRADEMARK OFFICE
CERTIFICATE OF CORRECTION

PATENT NO.        : 9,127,858 B2                               Page 1 of 1
APPLICATION NO.   : 12/953631
DATED             : September 8, 2015
INVENTOR(S)       : David Wayne McKeown et al.

It is certified that error appears in the above-identified patent and that said Letters Patent is hereby corrected as shown below:

In the Claims

At column 8, line 52, the word --fourth-- has been omitted, and should be inserted after the word "the" and before the word "central"

Signed and Sealed this
Nineteenth Day of January, 2016

Michelle K. Lee
*Director of the United States Patent and Trademark Office*